Figures 1, 2, 3:
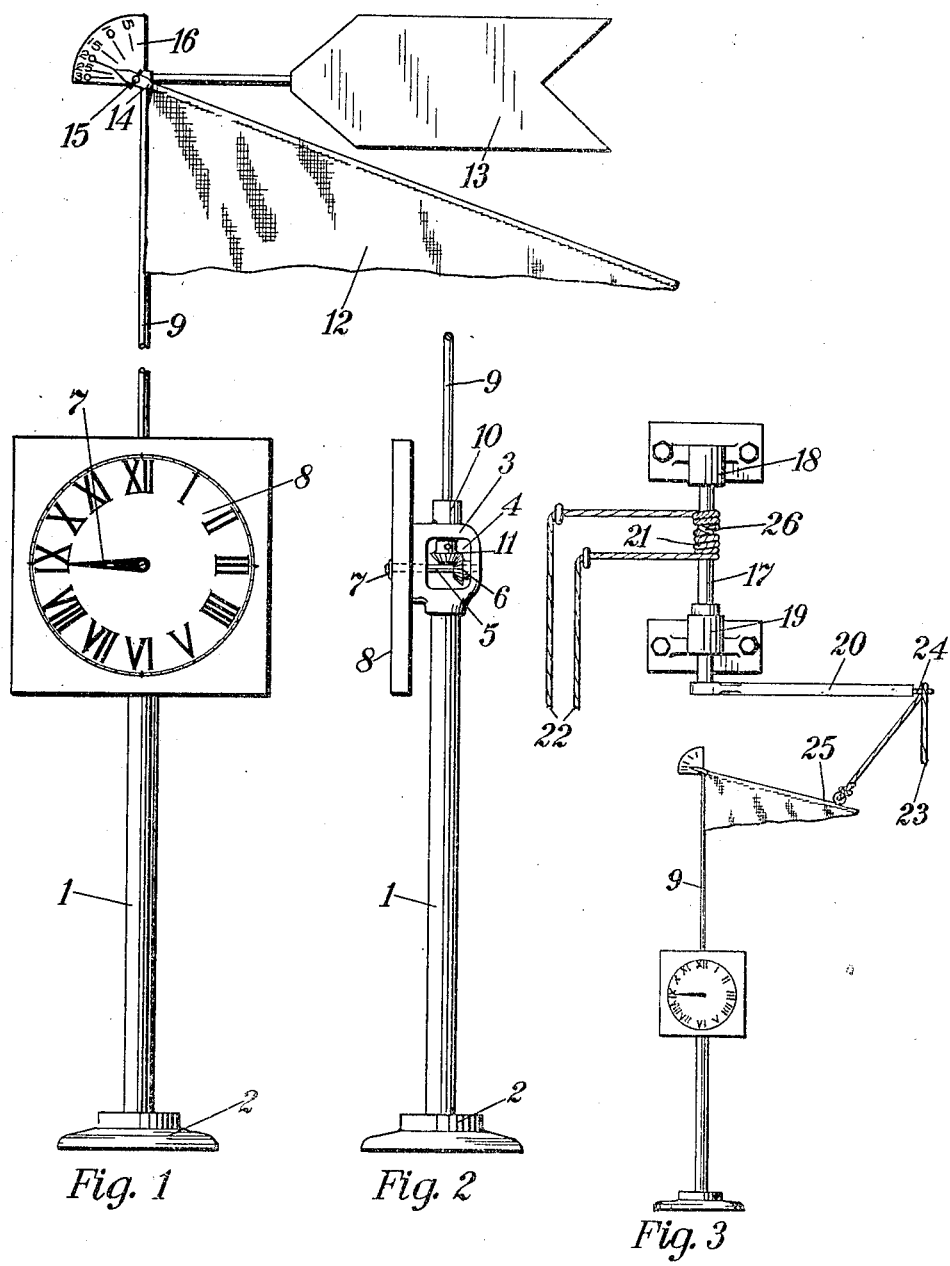

C. B. WINDER.
WIND INDICATING DEVICE FOR PRACTICE SHOOTING.
APPLICATION FILED APR. 29, 1907.

910,035. Patented Jan. 19, 1909.

WITNESSES:
Charles B. Winder, INVENTOR.
BY
ATTORNEY.

UNITED STATES PATENT OFFICE.

CHARLES B. WINDER, OF COLUMBUS, OHIO.

WIND-INDICATING DEVICE FOR PRACTICE-SHOOTING.

No. 910,035.   Specification of Letters Patent.   Patented Jan. 19, 1909.

Application filed April 29, 1907. Serial No. 370,998.

*To all whom it may concern:*

Be it known that I, CHARLES B. WINDER, a citizen of the United States, residing at Columbus, in the county of Franklin and State of Ohio, have invented a certain new and useful Improvements in Wind-Indicating Devices for Practice-Shooting, of which the following is a specification.

My invention relates to improvements in devices for indicating the direction and velocity of air currents, and is adapted to be used especially in connection with practice shooting on a miniature range or in a gallery; the marksman, in his practice exercises, should be trained in allowing in his aim, for weather conditions, especially the air conditions that are prevailing at the time. In actual warfare the efficiency of the soldier depends largely upon his ability to strike the object aimed at, and in order to accomplish this result, he must be able to accommodate himself to the atmospheric conditions existing at the time; if he has had a course of training in determining weather conditions and in adjusting his firearm to such conditions, he will have gained experience that will enable him quickly to determine his proper action under a given set of circumstances.

The object of my improvement in the kind of devices mentioned is to provide a ready means for giving the marksman or militiaman such training, and the devices herein described are adapted for use either in the gallery or on the range. It is well known that the apparatus used for this purpose consists of a dial, or as it is usually termed, a clock, and a flag, the former being used to indicate the direction of a prevailing wind, or current of air, the latter being used to indicate the velocity of the same.

The devices consist especially in the use of the clock and flag and vane in connection, so that the movement of the vane by the current of air will swing the hand around the face of the dial, and by inspection, the marksman can ascertain from what direction the wind is coming and with what velocity. If the devices are used for gallery shooting, both the direction and velocity of the wind must be assumed, there being no wind in reality, the desire being to accustom the marksman to various assumed conditions which might be found to exist if the practice were out of doors under normal conditions.

With these and other objects in mind which will be more fully set forth in the following description and in the claims, reference is made to the accompanying drawings, in which—

Figure 1 is a front view of the devices showing the dial, vane, and flag; Fig. 2 is a side view showing the arrangement of gearing for communicating the movement of the flag to the hand on the dial face; Fig. 3 shows devices for controlling the flag from a distance.

Referring to the drawings, 1 is a standard fixed rigidly into the base 2, the width of the base and the height of the standard being adapted to be made subject to the conditions under which the same are to be used; 3 is a member mounted upon the upper end of the standard 1 and having the chamber or opening 4 therein; in this opening 4 is journaled the shaft 5 carrying adjacent one end thereof the bevel gear 6. Adjacent the other end of said shaft is mounted the hand or indicator 7, which is adapted to move over the face of the dial 8, the latter being secured to the member 3 in any desirable manner. The dial contains the usual numerals found upon the face of the clock, numbered from 1 to 12 consecutively around the circle and the hand is adapted to assume any desired position upon the face of the dial, as is usual in clock construction.

In shooting practice it is customary to speak of the wind and to designate the same with reference to its direction as if it were blowing across the face of the clock dial; for instance, if the marksman be facing the dial, a wind blowing directly across the face from left to right along the horizontal diameter of the circle would be called a nine o'clock wind, and from the opposite direction, a three o'clock wind. In other words, a nine o'clock wind or a three o'clock wind blows directly at a right angle across the path of travel of a projectile if the same were discharged straight at the dial. A wind blowing directly away from the marksman would be called a six o'clock wind, and a wind blowing directly towards the marksman would be called a twelve o'clock wind. . A wind blowing from the direction between 3 and 6 would be spoken of ordinarily as a four or five o'clock wind, and if from a direction between 6 and 9, it would be ordinarily spoken of as a seven or eight o'clock wind. A wind blowing from other points on the dial would be designated according to the point from which it blows as above indicated.

9 is a rod rotatably mounted in the upper portion 10 of the member 3, which latter is preferably lengthened to give an extended bearing surface to the rod 9 whereby the same is firmly supported; rod 9 at its lower end carries the bevel gear 11 adapted to mesh with the gear 6 carried by the shaft 5; the result of this connection is that a rotation set up in the rod 9 will cause a rotation of the shaft 5 through the bevel gears, thereby turning the hand in the direction desired. Adjacent the upper end of the rod 9 is adjustably mounted a flag 12, which is provided for the purpose of indicating the velocity of the current of air. This velocity may be known from the angle at which the flag is sustained by the current of air. The greater the angle between the upper edge of the flag and the rod 9, the greater is the velocity of the current of air. It is readily seen that this must be so inasmuch as the flag is lifted from its normal drooping position by the current of air, and hence the greater the velocity of the current of air, the higher the flag will be lifted, therefore the greater the angle between the flag and the supporting rod.

Under outdoor conditions, not only would the flag indicate the velocity of the current of air but it would also show the direction, inasmuch as the flag would be carried round to the position where it would offer least resistance to the current of air; frequently, however, the position of a flag may not clearly indicate to the marksman what the direction of the prevailing wind may be, (for instance, when the direction is slightly to one side or the other of the four cardinal points on the dial), and in such case the dial would be consulted. Mounted adjacent the upper end of the rod 9, in proximity to the position of the flag, is the vane 13; the current of air striking the vane would swing it in one direction or another very readily, whereby the rod 9 would be rotated; through the bevel gearing a movement of the hand over the face of the dial would be set up, and when the vane assumed a position, the hand would indicate the direction from which the wind was blowing. The vane is susceptible to the movement of the air and would yield very readily to slight variations thereof; it may be mounted detachably so that its use may at any time be dispensed with without in any wise injuring the remainder of the apparatus.

In indoor practice shooting, it is assumed that there will be no actual current of air and under these conditions my devices are arranged to be set arbitrarily to represent any hypothetical current of air, both in its direction and in its velocity. Preferably under such conditions the flag is secured to the arm 14 which is adjustably mounted upon the rod 9 so that the arm may be lifted to any angle desired, and by means of the set screw 15 may be maintained at such angle. The sector plate 16 mounted adjacent the inner end of the flag arm 14, has indicated thereon different velocities, as 5, 10, 15, 20, 25 and 30 miles an hour and from each numeral is drawn a radial line towards the center of curvature of the sector; if the flag arm 14 be now raised so that it will form a continuation of the radial line indicated as 10 miles an hour, the angle made by the flag arm with the supporting rod 9, will represent the angle at which the flag would stand in a current of air blowing ten miles an hour. Ready adjustment may be made so that the flag arm will be in line with the numeral 15 or 20 or any of the other numerals provided, in each case the thing indicated by the angle between the flag arm and the rod 9 being the velocity of an assumed current of air, the angle being that formed by a flag under normal conditions when the air is actually moving with the velocity assumed. By some practice in this matter the marksman soon becomes familiar with the various angles of the flag and can readily identify each angle with a particular velocity. Therefore, in the manipulation of his fire-arm, in order to secure results, he must make adjustment to accommodate his aim to the assumed conditions, just as he would do if he were under out-door conditions. But not only is the velocity of the wind an essential fact, the direction thereof is also a necessary element for consideration in taking aim; the latter is provided for by the dial, which has been described above. In gallery work the hand on the dial may be set to indicate any assumed direction, and the flag may be swung into the assumed direction, thereby carrying the hand around to the proper point through the bevel gearing described. The assumed direction may be changed rapidly, and the rotation of the rod 9 by the flag will accurately and speedily bring the indicating hand to that point on the dial. Thereby the marksman soon comes to associate a given direction of the flag with a particular position of the hand upon the dial, and the lesson is learned which he can readily put into practice in his work out of doors.

In Fig. 3 is shown a construction whereby the flag and dial may be actuated at a distance therefrom, whereby the safety of the person manipulating the same is assured. Ordinarily, for indoor work, the target shown in my application No. 354,139, will be secured to the back-stop or framework, and the flag and clock will be placed in proximity thereto. To walk from the firing line to the latter devices and position the same anew each time a new target is to be set, not only requires time, but also may be attended with danger, inasmuch as a number of targets may be located on the same framework. To remove these objections, especially, I provide the construction shown in Fig. 3 which will now be described.

17 is a spindle mounted rotatably at its upper and lower ends in the brackets 18 and 19; rigidly carried by said spindle is the lateral arm 20. A number of turns 21 of a cord 22 are made about the spindle 17 being held from sliding on the spindle by the catch 26, and the ends of the cord are then carried away to a distance from the targets; preferably they may be carried to the firing line, so that the marksman may, without moving, lay down his fire-arm and pick up the cords and manipulate the same to turn the spindle in the direction desired. Another cord 23 having one end within easy reach of the marksman, or at some distance from the target, is passed through the ring 24 mounted upon the outer end of the arm 20, the other end of said cord being secured to the flag arm 25, the latter being mounted at the upper end of the rod 9 in such manner as to move pivotally upwardly and downwardly, but to move rigidly with said rod 9 in the lateral direction. If cord 23 be pulled, it will tend to lift the flag arm 25, whereupon the cord may be secured taut; this movement is for the purpose of positioning the flag to indicate velocity of the wind as explained above. Ordinarily, the instructor will manipulate the clock and flag, leaving the marksman free to adjust himself quickly to the new conditions indicated thereby.

If it is desired to indicate a change of the direction of the wind, the spindle 17 is manipulated by means of the cord 22, which swings the arm 20, which will carry with it the cord 23, passing through the ring 24, which will thereby draw after it the flag arm 25; through the bevel gearing above described, the lateral movement of the flag arm causes the hand to pass over the face of the dial. The manipulation of the spindle through the cord 22 may therefore be continued until the flag has been drawn around far enough to cause the hand to indicate the proper numeral on the dial.

The devices just described render it possible to manipulate the flag and clock from a distance, where it is safe, and danger is thereby escaped. In Fig. 3, the mounting of the dial and the bevel gear arrangement is the same as has been pointed out above.

The devices herein described may be used also for out of door work on a miniature range, under which conditions the angle of the flag may be determined by the movement of the current of air, and the position of the hand on the dial also determined in the same manner; it is clear also that even on the miniature outdoor range the devices may be manipulated in the manner shown in Fig 3. It is apparent, however, that the manipulation of the flag and clock would take place ordinarily under indoor conditions. When my devices are used on a miniature range out of doors, the position of the flag may be left entirely to the air currents, or an arbitrary position may be given thereto by the marksman; the movement of the clock may also be left to the influence of the air currents, or they may be regulated arbitrarily; so that either one or both of the devices may, on the outdoor range, be left free to atmospheric influences, or may be controlled arbitrarily by the marksman or instructor at his pleasure.

It is not intended herein to set forth specific forms of construction which must be adhered to but the intention has been merely to show one form of the embodiment of my idea; I do not intend to restrict myself to what is specifically shown and described but desire to take advantage of all the modifications which may be within the scope of the appended claims.

Having described my invention, what I claim as new and desire to secure by Letters Patent is:

1. Devices for indicating the direction and velocity of an assumed current of air, comprising a dial, a hand mounted adjacent thereto, a rotatable spindle, means for actuating said spindle at a distance therefrom, a flag adapted to be moved in substantially a horizontal plane by said spindle, connections between said flag and said hand whereby the latter is turned to indicate the direction of the assumed current of air, and means for moving said flag in a vertical plane to indicate the velocity of the wind.

2. Devices for indicating direction and velocity of an assumed current of air, comprising a dial, a hand mounted adjacent thereto, a flag, connection between said flag and said hand, means for raising or lowering said flag at a distance therefrom to indicate velocity, a rotatable spindle, connection between said spindle and said flag, and means for actuating said spindle at a distance therefrom.

In testimony whereof I affix my signature in the presence of two witnesses.

CHARLES B. WINDER.

Witnesses:
 GEO. W. RIGHTMIRE,
 A. RAGER.